United States Patent
Yuh

(10) Patent No.: US 6,456,719 B1
(45) Date of Patent: Sep. 24, 2002

(54) COMPRESSED AUDIO ERROR CONCEALMENT APPARATUS AND METHOD

(75) Inventor: Jou-Yang Yuh, Hsinchu (TW)

(73) Assignee: Winbond Electronics Corp., Hsin-Chu (TW)

( * ) Notice: Subject to any disclaimer, the term of this patent is extended or adjusted under 35 U.S.C. 154(b) by 0 days.

(21) Appl. No.: 09/073,513

(22) Filed: May 6, 1998

(30) Foreign Application Priority Data

Jan. 16, 1998 (TW) ........................................ 87100542 A
Mar. 21, 1998 (TW) ........................................ 87104240 A

(51) Int. Cl.[7] ................................................ H03G 7/00
(52) U.S. Cl. ........................................ 381/106; 704/201
(58) Field of Search ................................. 381/106, 107, 381/22–23; 333/14; 455/72; 700/94; 704/201, 222–228, 212; 714/746, 747, 748

(56) References Cited

U.S. PATENT DOCUMENTS 5,644,310 A * 7/1997 Laczko, Sr. et al. ........ 341/143
5,673,363 A * 9/1997 Jeon et al. ................. 395/2.79
5,943,347 A * 8/1999 Shepard ........................ 371/31
6,026,506 A * 2/2000 Anderson et al. .......... 714/746

* cited by examiner

Primary Examiner—Curtis Kuntz
Assistant Examiner—Lun-See Lao
(74) Attorney, Agent, or Firm—Thomas, Kayden, Horstemeyer & Risley

(57) ABSTRACT

An apparatus and method for error concealment of compressed audio data are provided. The apparatus includes a packet-unit controller, a threshold controller, coupled to the packet-unit controller, a scale detector coupled to the threshold controller, and an error-correction circuit coupled to the packet-unit controller and the scale detector. The method carried out by the apparatus includes the following a first step of decompressing the input compressed audio data a second step of checking whether any pair of successive scales in the input compressed audio data is incorrect and the packet length of the input compressed audio data a third step of, if either of the scales or the packet length is detected to be incorrect, performing the following substeps of discarding the current output of decompressed audio data, then setting the threshold to an error-mode threshold value and then checking the total number of correctly received packets; and a fourth step of, if the scale ratio, the packet length, and the packet total number are detected to be correct, performing the following substeps of outputting the decompressed audio data. and then setting the scale threshold to a normal-mode threshold value.

11 Claims, 3 Drawing Sheets

COMPRESSED AUDIO ERROR CONCEALMENT APPARATUS AND METHOD

CROSS-REFERENCE TO RELATED APPLICATION

This application claims the priority benefit of Taiwan application serial no. 87100542, filed Jan. 16, 1998, the full disclosure of which is incorporated herein by reference.

BACKGROUND OF THE INVENTION

1. Field of the Invention

This invention relates to digital audio signal processing techniques, and more particularly, to an apparatus and method for concealment of any erroneous part of received compressed audio data during the decompression process.

2. Description of Related Art

Large volumes of digital data, such as audio data, are usually compressed before being put into storage or transmission so as to reduce the required storage space or transmission burden. Compressed audio data should undergo a decompression process before they can be actually utilized for broadcast. During the transmission, however, errors can occur due to noises or any forms of distortions in the transmission path. When errors occur, an error detection and correction process should be performed so as to discover and resolve the errors in the received data. If the errors in the compressed audio data are not corrected, they can cause, after being decompressed for broadcast, an undesired sharp, noisy sound when being broadcast through a loudspeaker.

There exists, therefore, a need for an apparatus and method that can resolve the foregoing problem so as to allow the compressed audio data to be broadcast with their original sound quality.

SUMMARY OF THE INVENTION

It is therefore an objective of the present invention to provide an apparatus and method for error concealment of compressed audio data, which can conceal the erroneous part, if found, of the received compressed audio data so as to allow the compressed audio data to be broadcast with their original sound quality.

It is another an objective of the present invention to provide an apparatus and method for error concealment of compressed audio data, which can detect errors in the received compressed audio data and conceal them.

In accordance with the foregoing and other objectives of the present invention, an apparatus and method for error concealment of compressed audio data is provided.

The apparatus of the invention includes a packet-unit controller, a threshold controller, a scale detector, and an error-correction circuit, wherein the packet-unit controller is coupled to receive the compressed audio data, for performing an error checking and decompression operation on the compressed audio data.

The threshold controller in the apparatus according to the invention is coupled to said threshold controller, capable of generating a threshold control signal in response to the result of the error-checking operation performed by said packet-unit controller.

The scale detector in the apparatus according to the invention is coupled to receive the input compressed audio data and the output threshold control signal from said threshold controller, capable of performing a scale checking operation to check the packet length of the received compressed audio data and also to check whether any pair of successive scales in the received compressed audio data is incorrect to thereby generate and transfer a scale error signal to said packet-unit controller and said error-correction circuit.

The error-correction circuit in the apparatus according to the invention is coupled to said scale detector and said packet-unit controller, capable of performing an error concealment operation on the output decompressed audio data from said packet-unit controller based on the value of the scale error signal from said scale detector so as to discard the erroneous decompressed audio data and then output a corrected version of the discarded -data.

The method of the invention starts with decompressing the input compressed audio data followed by checking whether any pair of successive scales in the input compressed audio data is correct in ratio and whether the packet length of the input compressed audio data is correct. If either of the scale ratio or the packet length is detected to be incorrect, then performing the following substeps of discarding the current decompressed audio data, setting the threshold control signal to an error mode threshold value and detecting the number of correctly received packets. In the other hand, if the scale ratio, the packet length, and the total number of correctly received packets are detected to be correct, then performing the following substeps of outputting the decompressed audio data and then setting the threshold control signal to a normal mode threshold value.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
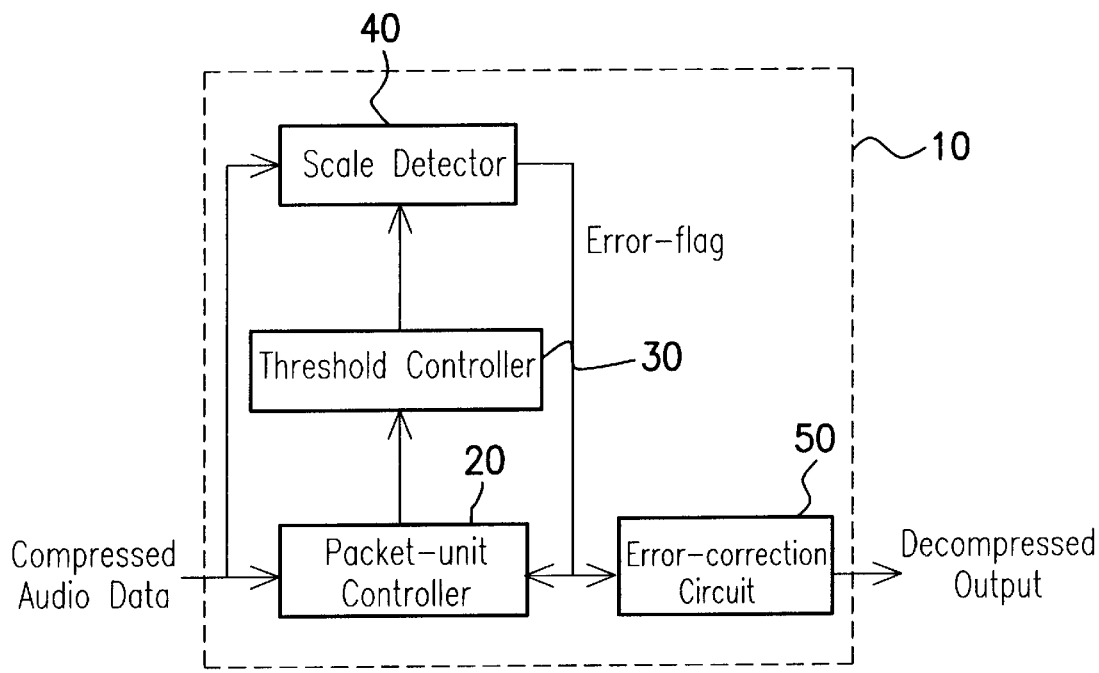
FIG. 1 is a schematic block diagram showing the architecture of the compressed audio error concealment apparatus according to the invention.

FIG. 1 is a schematic block diagram showing the architecture of the compressed audio error concealment apparatus according to the invention, whose constituent elements are enclosed in a dashed box designated by the reference numeral 10. As shown, the compressed audio error concealment apparatus 10 of the invention includes a packet-unit controller 20, a threshold controller 30, a scale detector 40 and an error-correction circuit 50. The apparatus 10 of the invention is devised to receive and process the input of a stream of compressed audio data which is structured in frames, each frame being appended with a synchronization word in the head thereof The output of the apparatus 10 is a stream of the decompressed version of the received compressed audio data, which are outputted in paired words at a rate of 44.1 kHz (kilohertz), for example.

Inside the apparatus 10, the received compressed audio data are routed to both the packet-unit controller 20 and the scale detector 40. The packet-unit controller 20 is capable of generating a packet-length error signal to the threshold controller 30 when it finds that the packet length of the received compressed audio data is erroneous, and then of checking the number of the packets in the received compressed audio data. It also performs a decompression process on the received compressed audio data. Details of the procedure performed by the packet-unit controller 20 to carry out these tasks will be fully disclosed later in this specification with reference to FIG. 2.

The threshold controller 30, in response to the packet-length error signal and the information about the total number of correctly received packets from the packet-unit controller 20, will perform an auto threshold adjustment operation so as to adjust for a suitable threshold accordingly and then output a threshold control signal to the scale detector 40. When the data transmission is normal, the total number of correctly received packets will reach a preset number. However, if any error is detected during the auto threshold adjustment operation, the packet-unit controller 20 will reset a packet counter register which stores the current total number of correctly received packets to 0, preventing the content of the packet counter register from continuing to increase until reaching the preset number. Details of the procedure performed by the threshold controller 30 to carry out these tasks will be fully disclosed later in this specification with reference to FIG. 3.

The scale detector 40 processes the received compressed audio data based on a scale threshold value set by the threshold control signal from the threshold controller 30 to thereby check whether any pair of successive scales in the received compressed audio data is incorrect. If any incorrect scale ratio is detected, the scale detector 40 will generate a scale error signal (error flag) to both the packet-unit controller 20 and the error-correction circuit 50 for these two units 20, 50 to take prescribed actions. Details of the procedure performed by the scale detector 40 to carry out these tasks will be fully disclosed later in this specification with reference to FIG. 4.

The error-correction circuit 50 then performs an error-concealment operation on the decompressed audio data from the packet-unit controller 20, based on the scale error signal from the scale detector 40, to thereby discard the current output of the decompressed audio data from the packet-unit controller 20 and at the same time clear the output buffer area for the decompressed audio data. After this, the error-correction circuit 50 will output the corrected version of the decompressed audio data, allowing the audio system to operate in a mute mode. Details of the procedure performed by the error-correction circuit 50 to carry out these tasks will be fully disclosed later in this specification with reference to FIG. 5.

FIGS. 2–5 are flow diagrams showing the procedural steps respectively performed by the packet-unit controller 20, the threshold controller 30, the scale detector 40 and the error-correction circuit 50 to carry out the above-mentioned operations.

Figure 2:
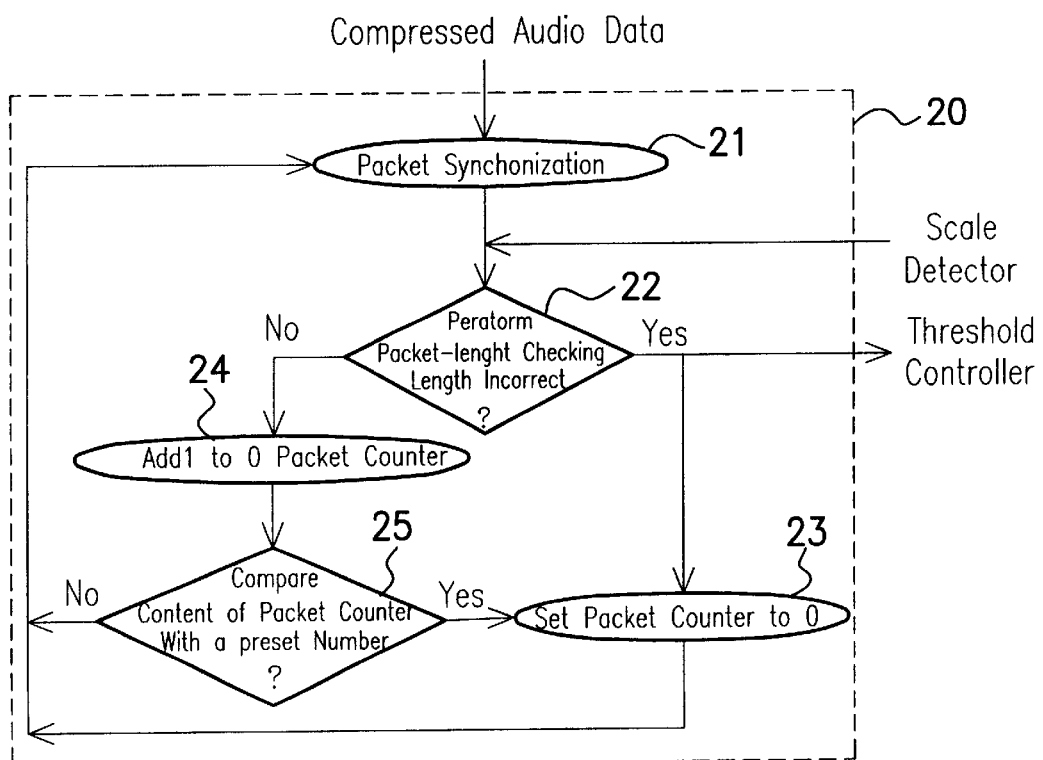
FIG. 2 is a flow diagram showing the operating procedural steps carried out by the packet-unit controller utilized in the apparatus of FIG. 1.

Referring to FIG. 2, when the packet-unit controller 20 receives the compressed audio data, it performs the first step 21 for packet synchronization of the received compressed audio data. The procedure then goes to the subsequent step 22 to perform a packet-length checking operation to check whether the packet length of the received compressed audio data is correct or not If incorrect, the packet-unit controller 20 will send out a packet-length error signal to the threshold controller 30 and then proceed to the step 23 to set the packet counter register to 0. The procedure then jumps back to the step 21 to keep receiving the successive compressed audio data. Otherwise, if in the step 22 the result is correct, the procedure goes to step 24 to increase the content of the packet counter register by one. Then, the procedure goes to step 25 to compare the content of the packet counter register with a preset number to check whether the total number of correctly received packets has reached the preset number. If yes, the procedure goes to step 23 to reset the packet counter register to 0; otherwise, if no, the procedure jumps back to the step 21 to keep receiving the successive compressed audio data.

Figure 3:
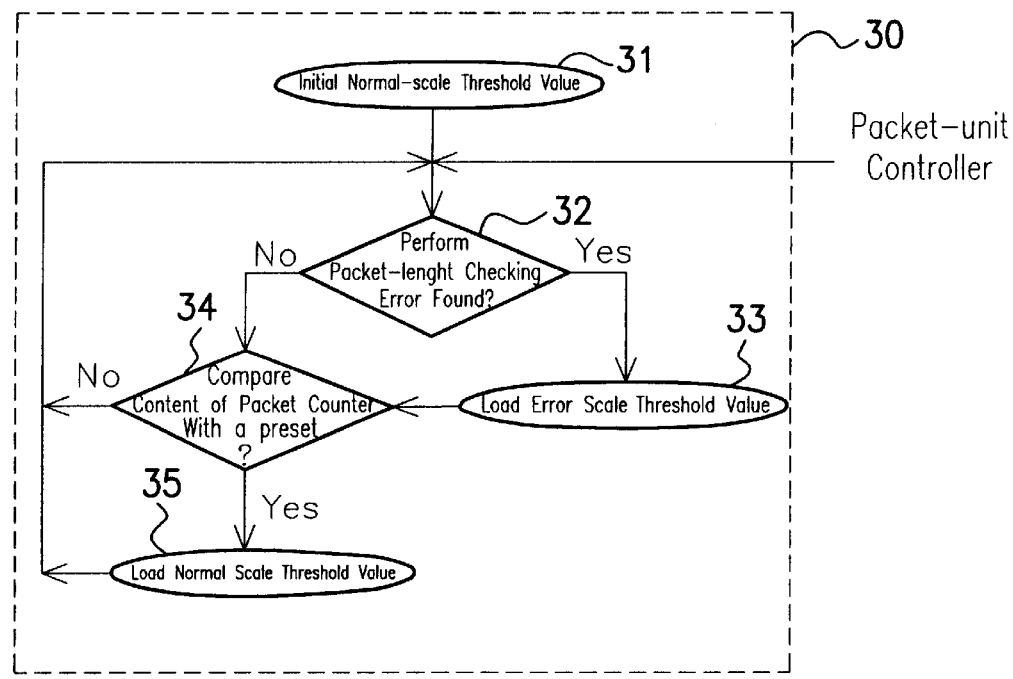
FIG. 3 is a flow diagram showing the operating procedural steps carried out by the threshold controller utilized in the apparatus of FIG. 1.

FIG. 3 shows the operating procedural steps carried out by the threshold controller 30 utilized in the apparatus 10 of FIG. 1. In the step 31, an initial normal-scale threshold value is set. When a packet-length error signal is received from the packet-unit controller 20, the procedure goes to step 32 to perform a packet-length checking operation to check whether the length of the currently received packet is equal to the initial normal-scale threshold value set in the initial step 31. If unequal, the procedure goes to step 33 to load an error-scale threshold value; after this, the procedure goes to step 34. If the result in step 32 is equal, the procedure goes directly to step 34. In step 34, the threshold controller 30 checks whether the total number of correctly received packets has reached the preset number. If yes, the procedure goes to step 35 to load the normal-scale threshold value; otherwise, the procedure goes back to step 32 to keep performing the packet-length checking operation and the threshold value will maintained at the erroneous one.

Figure 4:
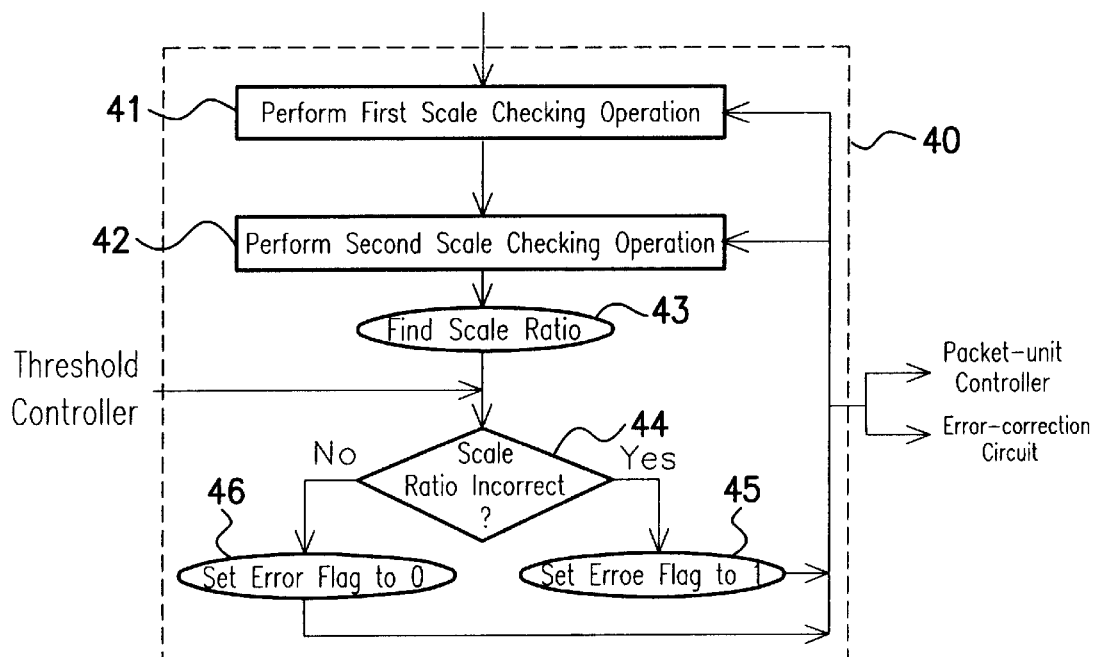
FIG. 4 is a flow diagram showing the operating procedural steps carried out by the scale detector utilized in the apparatus of FIG. 1.

FIG. 4 shows the operating procedural steps carried out by the scale detector 40 utilized in the apparatus 10 of FIG. 1. When the scale detector 40 receives the input compressed audio data, it first performs step 41 to carry out a first scale checking operation to check the number of scale units in the received compressed audio data. Scale detector 40 then performs the step 42 to carry out a second scale checking operation to check the number of types of scales in the received compressed audio data. The procedure then goes to step 43 to determine the scale ratio between each pair of successive scales in the received compressed audio data by dividing each scale by the succeeding one. The procedure then goes to step 44 to perform a scale comparison operation based on the results obtained from the operation of step 43 and the output from the threshold controller 30. If any scale ratio obtained from the operation of step 43 is greater than the scale threshold, the procedure goes to step 45 to set an error flag to 1; otherwise, the procedure goes to step 46 to set the error flag to 0. The content of the error flag (scale error signal) is then transferred to both the packet-unit controller 20 and the error-correction circuit 50, and is also used by step 41 and step 42 to perform the first and second scale checking operations on the subsequently received compressed audio data.

Figure 5:
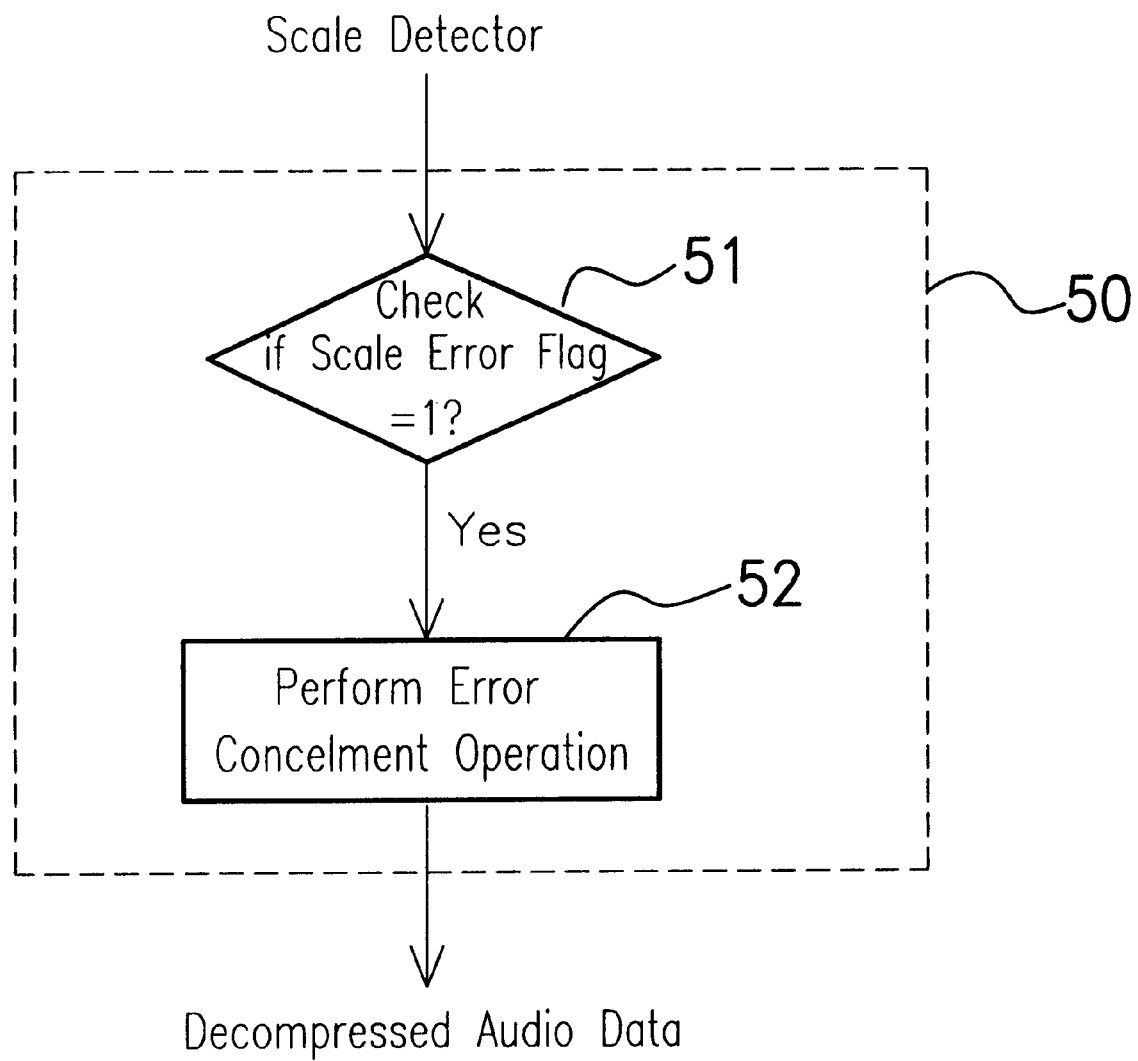
FIG. 5 is a flow diagram showing the operating procedural steps carried out by the error-correction circuit used in the apparatus of FIG. 1.

FIG. 5 is a flow diagram showing the operating procedural steps carried out by the error-correction circuit 50 utilized in the apparatus 10 of FIG. 1. In the first step 51, the error-correction circuit 50 checks whether the content of the error flag in the scale detector 40 is 1. If it is, the procedure goes to the next step 52 to perform an error concealment operation to discard the current decompressed audio data from the packet-unit controller 20 and clear the output buffer area for the decompressed audio data to 0.

As a summary to the method of the invention, the procedural steps thereof are briefly reviewed as follows. The first step is to decompress the input compressed audio data. The second step is to set a packet counter register to 0 and then check whether the currently received packet length is correct; if correct, the content of the packet counter register will be increased by one until it reaches a preset number; otherwise, the packet counter register will be reset to 0.

Subsequently, the third step is to compare the current scale threshold value with the initial normal-scale threshold value. If incorrect, the erroneous scale threshold value is loaded until the total number of correctly received packets reaches the preset number; otherwise, the erroneous scale threshold value will be maintained.

The next step is to check the number of scale units in the received compressed audio data and also check the number of types of scales in the received compressed audio data. Each scale is then divided by the succeeding one to thereby obtain a scale ratio.

If any scale ratio is detected to be greater than the scale threshold value, an error flag is set to 1; otherwise the error flag is set to 0. The condition of the error flag being set to 1 will then cause the currently decompressed audio data to be discarded and the output b.

What is claimed is:

1. An apparatus for concealment of errors in an input stream of compressed audio data, which comprises:
    a packet-unit controller, coupled to receive the compressed audio data, for performing an error-checking and decompression operation on the compressed audio data;
    a threshold controller, coupled to said packet-unit controller, capable of generating a threshold control signal in response to the result of the error-checking operation performed by said packet-unit controller;
    a scale detector, coupled to receive the input compressed audio data and the output threshold control signal from said threshold controller, capable of performing a scale checking operation to check the packet length of the received compressed audio data and also to check whether any pair of successive scales in the received compressed audio data is incorrect to thereby generate and transfer a scale error signal to said packet-unit controller and an error-correction circuit; and
    said error-correction circuit, coupled to said scale detector and said packet-unit controller, capable of performing an error concealment operation on the output decompressed audio data from said packet-unit controller based on the value of the scale error signal from said scale detector so as to discard the erroneous decompressed audio data and then output a corrected version of the discarded data.

2. The apparatus of claim 1, wherein said scale detector performs the scale checking operation by dividing each scale by the succeeding one to obtain a scale ratio and then checks whether the scale ratio is correct.

3. The apparatus of claim 1, wherein said scale detector discards the decompressed audio data if either the scales or the packet length is detected to be erroneous, and then sets the threshold control signal to an error mode and starts the detection for the number of correctly received packets.

4. The apparatus of claim 1, wherein said scale detector commands said error-correction circuit to output the decompressed audio data if all of the scales, the packet length and the total number of correctly received packets are detected to be normal, and then sets the threshold control signal to a normal mode.

5. A method for concealment of errors in an input stream of compressed audio data, comprising the steps of:
    (1) decompressing the input compressed audio data;
    (2) checking whether any pair of successive scales in the input compressed audio data is correct in ratio and whether the packet length of the input compressed audio data is correct;
    (3) if either the scale ratio or the packet length is detected to be incorrect, then performing the following substeps of:
        discarding the current decompressed audio data;
        setting the threshold control signal to an error mode threshold value; and
        detecting the number of correctly received packets;
    (4) if the scale ratio, the packet length, and the total number of correctly received packets are detected to be correct, then performing the following substeps of outputting the decompressed audio data; and
        setting the threshold control signal to a normal mode threshold value.

6. The method of claim 5, wherein the normal-mode threshold value is the initially set value for the scale threshold.

7. The method of claim 5, further comprising the step of:
    setting a packet counter register to 0 if the packet length is detected to be incorrect.

8. The method of claim 7, further comprising, if the packet length is correct, the steps of:
    increasing the content of the packet counter register by one each time one correct packet is received until the content of the packet counter register reaches a preset number; and
    resetting the packet counter register to 0 whenever any received packet is detected to be incorrect in length.

9. The method of claim 5, further comprising the step of:
    loading a normal-mode threshold value to replace the current error-mode threshold value if the total number of correctly received packets reaches the preset number.

10. The method of claim 5, further comprising the step of:
    setting an error flag to 1 if any one of the scales in the compressed audio data is greater than the threshold value, and to 0 otherwise.

11. The method of claim 10, further comprising, if the error flag is 1, the steps of:
    discarding the decompressed audio data; and
    clearing the output buffer area for the decompressed audio data to 0.

* * * * *